(12) United States Patent
Minter et al.

(10) Patent No.: US 9,544,308 B2
(45) Date of Patent: Jan. 10, 2017

(54) COMPLIANT AUTHENTICATION BASED ON DYNAMICALLY-UPDATED CREDENTIALS

(71) Applicants: Ronald Henry Minter, Edgewater, FL (US); Edward Tomes, Barrie (CA); Pasteur Lutashubanyuma Ntake, Barrie (CA); Rama Rama Mwikalo, Dar Es Salaam (TZ)

(72) Inventors: Ronald Henry Minter, Edgewater, FL (US); Edward Tomes, Barrie (CA); Pasteur Lutashubanyuma Ntake, Barrie (CA); Rama Rama Mwikalo, Dar Es Salaam (TZ)

( * ) Notice: Subject to any disclaimer, the term of this patent is extended or adjusted under 35 U.S.C. 154(b) by 223 days.

(21) Appl. No.: 14/530,721

(22) Filed: Nov. 1, 2014

(65) Prior Publication Data

US 2016/0127359 A1    May 5, 2016

(51) Int. Cl.
| | |
|---|---|
| G06F 15/16 | (2006.01) |
| G06F 7/04 | (2006.01) |
| H04L 29/06 | (2006.01) |
| G06F 21/32 | (2013.01) |
| G06K 9/00 | (2006.01) |

(52) U.S. Cl.
CPC ........... *H04L 63/0861* (2013.01); *G06F 21/32* (2013.01); *G06K 9/00906* (2013.01); *H04L 63/107* (2013.01)

(58) Field of Classification Search
None
See application file for complete search history.

(56) References Cited

U.S. PATENT DOCUMENTS

| | | | |
|---|---|---|---|
| 2006/0136335 A1* | 6/2006 | Ferguson | G06Q 20/102 705/40 |
| 2011/0231911 A1* | 9/2011 | White | H04L 63/08 726/7 |
| 2013/0227651 A1* | 8/2013 | Schultz | G06F 21/32 726/4 |
| 2014/0188770 A1* | 7/2014 | Agrafioti | A61B 5/117 706/13 |
| 2014/0359722 A1* | 12/2014 | Schultz | H04L 9/3231 726/5 |

* cited by examiner

*Primary Examiner* — Kenny Lin (57) ABSTRACT

A system, method and a computer-readable medium for authenticating a user in a live manner in non-face-to-face transactions, including a user downloading an authentication application from a server to a pervasive computing device, and after downloading the application, having an icon residing on the display of the device. When the authentication application is activated by the user, biographical and multi-biometric information of the user is requested by the application, and subsequently submitted to an authentication engine residing in a secure network cloud. The authentication process further includes, verifying by the authentication engine all of the requested information, compliance with government regulations such as CFT/AML, and the $4^{th}$ Data Protection Principle. Users have the ability to check their biographical data through a system called, RITE, forming part of this application. Memorised IDs and passwords are not required. The aliveness of the user is verified at each transaction request.

14 Claims, 7 Drawing Sheets is a diagram of a system for a "compliant dynamic authentication of a user"

Figure 1 is a diagram of a system for a "compliant dynamic authentication of a user"

Figure 2: The SEAL Enrollment Process

Figure 3: Aliveness of user Verification Process

Figure 4: Anti-Spoofing Processing

Figure 5: The Testing for Accuracy and Integrity of Enrolment Data Process

Figure 6: User Service Request, Identification and Authentication Process

Figure 7: The SEAL Authentication Engine with Biographical and Biometric Data Sources

COMPLIANT AUTHENTICATION BASED ON DYNAMICALLY-UPDATED CREDENTIALS

FIELD OF THE INVENTION

The present invention generally relates to an authentication system and method. More specifically, the invention relates to a system and method for dynamically authenticating pervasive computing device users in a "live"or "near live"manner, performing "real-time "non-face-to-face user identification and authentication, verifying that the biographical data provided by the user belongs to the user and is not stolen, and ensuring that devise users comply with government regulations (e.g. Anti-Money Laundering (AML), Counter Terrorism Financing (CFT), etc.) prior to accessing a restricted network-based resource or service. This application is a continuation International Application No. PCT/US2014/000068, filed Mar. 31 2014, which is a continuation of U.S. Provisional Application 61/902,170 filed Nov. 9, 2013. The Applicants a fully aware of a Canadian patent application number CA 2509545, filed Jun. 6, 2005 that dealt with voice identification and authentication.

BACKGROUND INFORMATION AND RELATED PRIOR ART

With the advent of non-face-to-face transactions in the areas of e-commerce, banking, gaming, etc. using online mobile devices and the associated Cloud-based services, incidents of identity theft and the associated fraudulent use of stolen users' credentials to commit crimes has escalated at an alarming rate. Such fraud has arguably risen to be the number one threat to the mass adoption of non-face-to-face electronic transaction services. Governments all over the world have enacted laws limiting the monetary levels of transactions and an adoption of worldwide "Data Protection Principles" in order to protect individuals' credentials and identities.

For online service providers it is often necessary to identify and authenticate a user or customer before granting or authorizing access to certain restricted resources or services to consummate or complete the transactions. Typically, in the prior art, users are required to present a subset of the Biographical credentials such as, passport numbers, social security numbers, driver's license numbers, Passwords, Passphrases, PIN numbers, or talk to a live agent to reveal information or Token for authentication. Typically, service providers implement their own authentication scheme with their own set of credentials. As a result, it is quite common for a user or customer to have to remember and present a plurality of such credentials to gain access to different systems or online services. From the average user's perspective, having to remember multiple passwords is extremely difficult and painful; it is also highly error prone. Forgotten user names and passwords need to be reset often which is also another source of user complaints.

The realization that authentication using only Biographical information was very inadequate for authenticating a user in an online non-face-to-face transaction, has created a need for stronger and better authentication techniques. Thus, many systems and solutions utilizing multiple biometric data such as fingerprint, facial print, voiceprint, iris scan data, eye pupil movements, etc were proposed.

Several patents were issued and others applied for, relating to identification & authentication using biometric data. Notably, are the patents issued to Parker U.S. Pat. No. 6,985,070 Kaneusky et al, IBM US Patent number 02/U.S. Pat. No. 6,421,453 B1, Paul T-Schultz patent application Ser. No. 13/407,079, Grzybouski Patent application number 2011/0145817 and Yeruchem LEVOVITZ, patent Ser. No. 13/007,629

Our invention differs from the above by requiring the simultaneous capture of facial and voice utterances as part of our "user aliveness" verification. This feature is contained in our Provisional Patent Application, filing dated 9, Nov. 2013 and on which this patent application is based.

In prior art, identification and authentication solutions, there is the mandatory requirement for the user to be physically present at a registration site or location for identity vetting prior to obtaining the user's biometric samples (be it fingerprints, facial profile, live video or voice print) or biographical data (name, address, passport number, etc). This is required because there is no other way to establish the identity of a new applicant. Such solutions tend to be not only inconvenient for customers but they also tend to be costly and ill-suited for wide scale deployment.

Vetting a client online as currently demanded by online service providers prior to obtaining the customers biometric samples has its vulnerabilities. A fraudster bent on stealing and using someone else's stolen identity documents could identify himself or herself online using someone else's real name, real passport number, real social security number or real driver's license number without being detected. When these stolen identities are checked against the records in any authoritative databases as part of the pre-registration vetting process, the information provided online by the fraudster will most likely be found to be accurate and the vetting process will then be declared successful. That means, the vetted person will be allowed to register using the information obtained from the stolen identity documents. Following successful vetting, the applicant will be able submit his real photograph and real biometric credential such as fingerprints, facial image, voiceprint, iris scans or retina scans to complete the online registration using someone else's name. Following successful registration, the imposter will be granted an online identity that can be authenticated using the collected biometric credentials. Therefore, in this particular identity theft scenario, the imposter will have successfully managed to establish an online identity by using someone else's identity documents which makes this a case of online identity theft. Accordingly, there is a need for an online fraudster-resistant identity vetting and validation process that cannot easily be taken advantage of by using someone else's stolen identity documents such as a driver's license and passport. The fraudster-resistant identity vetting and validation process must be able to determine to a reasonable degree of certainty the true identity of the user applying for registration prior to allowing the applicant to continue with the standard registration process that involves submitting biographical and biometric data online through the registration portal. Prior art identity vetting and validation method involves a physical visit by the applicant to a designated registration office such as a Bank branch or processing center where the identity documents can be inspected physically and visually by a trained registration agent. In this invention, the identity vetting and validation process is performed online to eliminate the inconvenience of having the customer to pay a physical visit to a registration office or center.

Based on the forgoing, it is clear that there is a need for an authentication and identification methodology and system that address many key issues that the current Biometric and Biographical methods have either partially addressed or have missed altogether. Thus, this invention addresses the need to implement a methodology that can be broadly deployed in networks and usable by a plurality of service providers, Specifically this invention addresses a) compliance to government regulations (such as Anti-Money Laundering, Counter Terrorism Financing, etc, b) ensuring that the individual online is who he/she claims to be, c) verifying that the user online is a living person and not a set of fake biometric data on a mobile device (ie the "aliveness" test), d) ensuring that the integrity and accuracy of the enrolment data on file used to authenticate a user is kept up to date and meets the "Fourth Data Protection Principle", and e) verify that the biographical data being used for enrolment and authentication of the user is not stolen and being used fraudulently.

DESCRIPTION OF THE INVENTION

Figure 1:
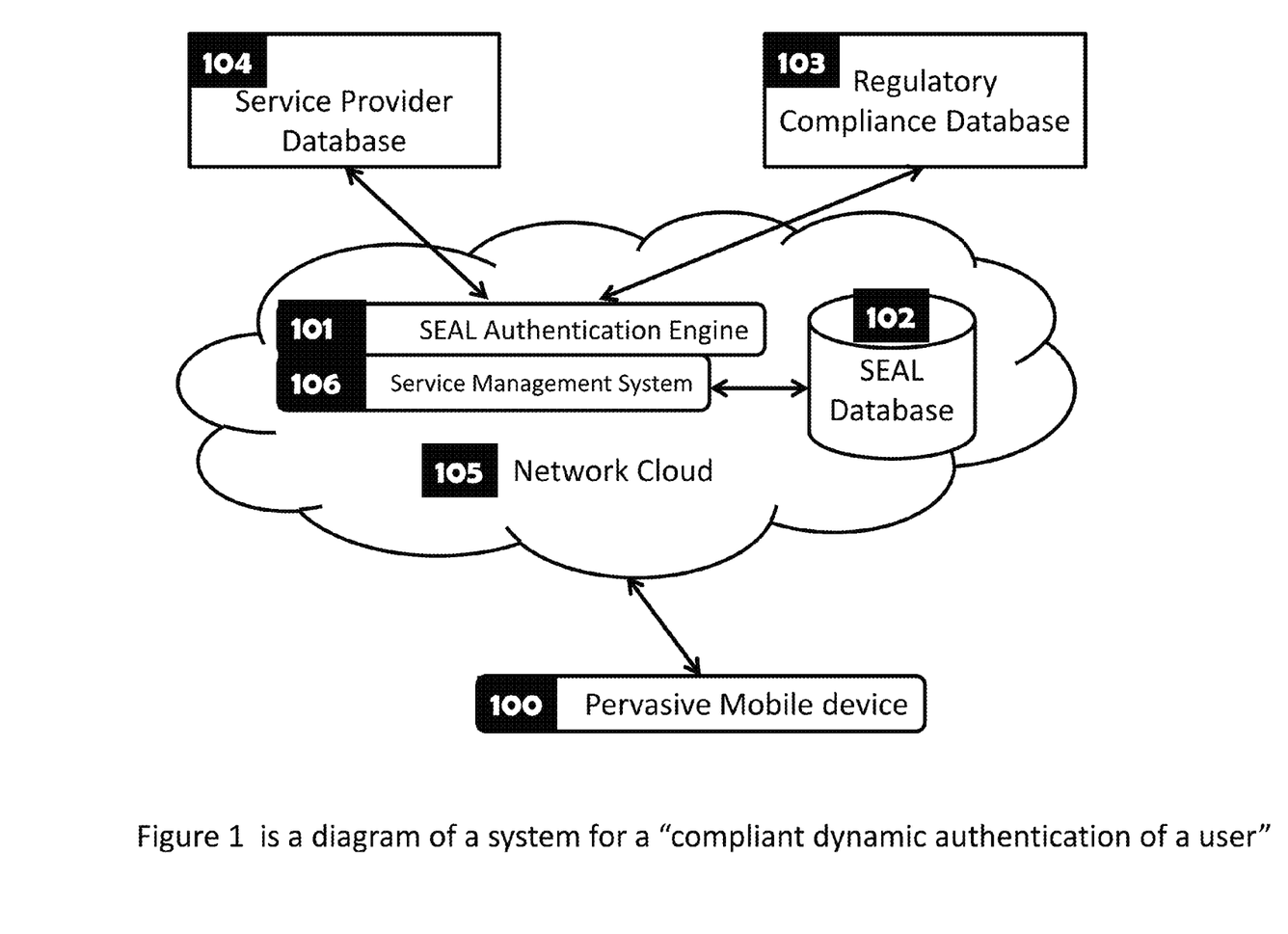
FIG. 1 is a diagram of a system for a "compliant dynamic authentication of a user"

FIG. 1 is a block diagram of a system that enables a user of a pervasive computing device 100, to enroll and later on request online services from service providers 104. The technology to capture biographical data (eg name, address, passport number, etc) and the technology to capture biometric data (eg voice prints, facial print and video clips, retina scans, iris scans, fingerprints) by mobile device 104 is considered to be prior art in this invention. Both the Service Provider 104 (eg a casino, bank, any e-commerce company, etc) and the Credit Reference Agency 103 provide mostly biographical user data to the authentication engine 101. The user's credential data (both biographical and biometric data) is maintained and continually updated by prior art identity Service Management software 106 currently available in the industry today. The combined SEAL database 102 is stored in Cloud network 105.

Figure 2:
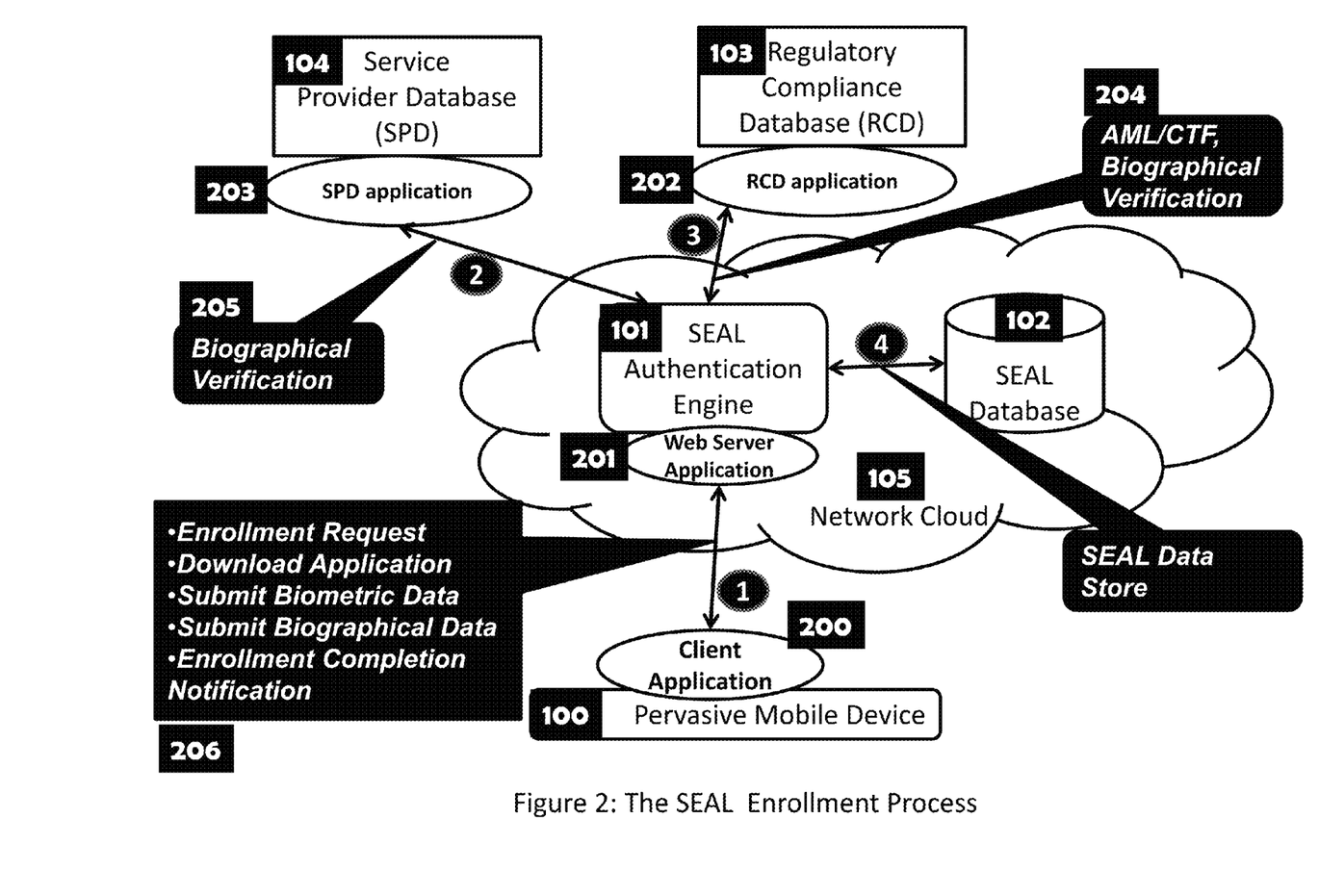
FIG. 2: The SEAL Enrollment Process

In one embodiment of the present invention, an enrolment method for a user of a pervasive computing device 100 is shown in FIG. 2. It includes a web-server 201 residing in the Cloud 105 that enables the downloading by the user of an authentication client application 200. The enrolment method includes the following steps:
a) Authorization by the user to release personal data;
b) Capturing the customer biographical data by the Pervasive Mobile Device 100 (e.g. Name, Address, date of birth, social security number/social insurance number, Passport No, Driver's License Number, etc.);
c) Capturing biometric data by the Pervasive Mobile Device 100, (e.g. Voice Print, Facial Image, Iris Scan, Retina Scan, and possibly future DNA prints, etc.);
d) Capturing the GPS Location of the Pervasive Mobile Device 100 and MAC address of the Pervasive Mobile Device 100
e) Capturing user personal data by the Pervasive Mobile Device 100 (eg Mother's Maiden Name, Favorite Pet, or other specific personal information) essential in the verification process.
f) Retrieving biographical data from Credit Reference Agencies (CRAs) 204;
g) Retrieving compliance data from Credit Reference Agencies (CRAs) 204
h) Retrieving biographical data from the Service Provider 205
i) Comparing and correlating the captured user data with that retrieved from CRA data 204 and that from the Service Provider data 203
j) Performing an "aliveness" test 303 as in FIG. 3
k) Performing "anti-spoofing" test as in FIG. 4
l) Checking for "Accuracy and Integrity" of the enrolment data as in FIG. 5
m) Assigning a unique encrypted identifier, SEAL, label to the user if the identity of the user is fully verified;
n) Requesting the user to verify the integrity and accuracy of their biographical data
o) Presenting the enrolment identifier to the verified user so it can be used to access services including RITE, (Reverse Identify Transfer Exchange), which enables the users to view their own biographical, SEAL, data.

Another embodiment of the present invention, is the dynamically and randomly updating feature of the SEAL enrolment voice print. This feature requires that during enrollment the user is presented with a set of 10 alphanumeric characters to read out herewith referred to as the "SEAL alphanumeric authentication set" (SAAS). The SAAS is read out and captured by a client application 200 residing on the user's pervasive computing device 100 for future comparison when actual user authentication is performed. The SAAS is submitted to the SEAL authentication engine 101 for processing and secure storage in the SEAL database 102. This eliminates the need for a customer having to remember a password or Personal Identification Number, (PIN). In the future, the captured voice print can be used for matching with a live sample of the user's voice print.

Figure 3:
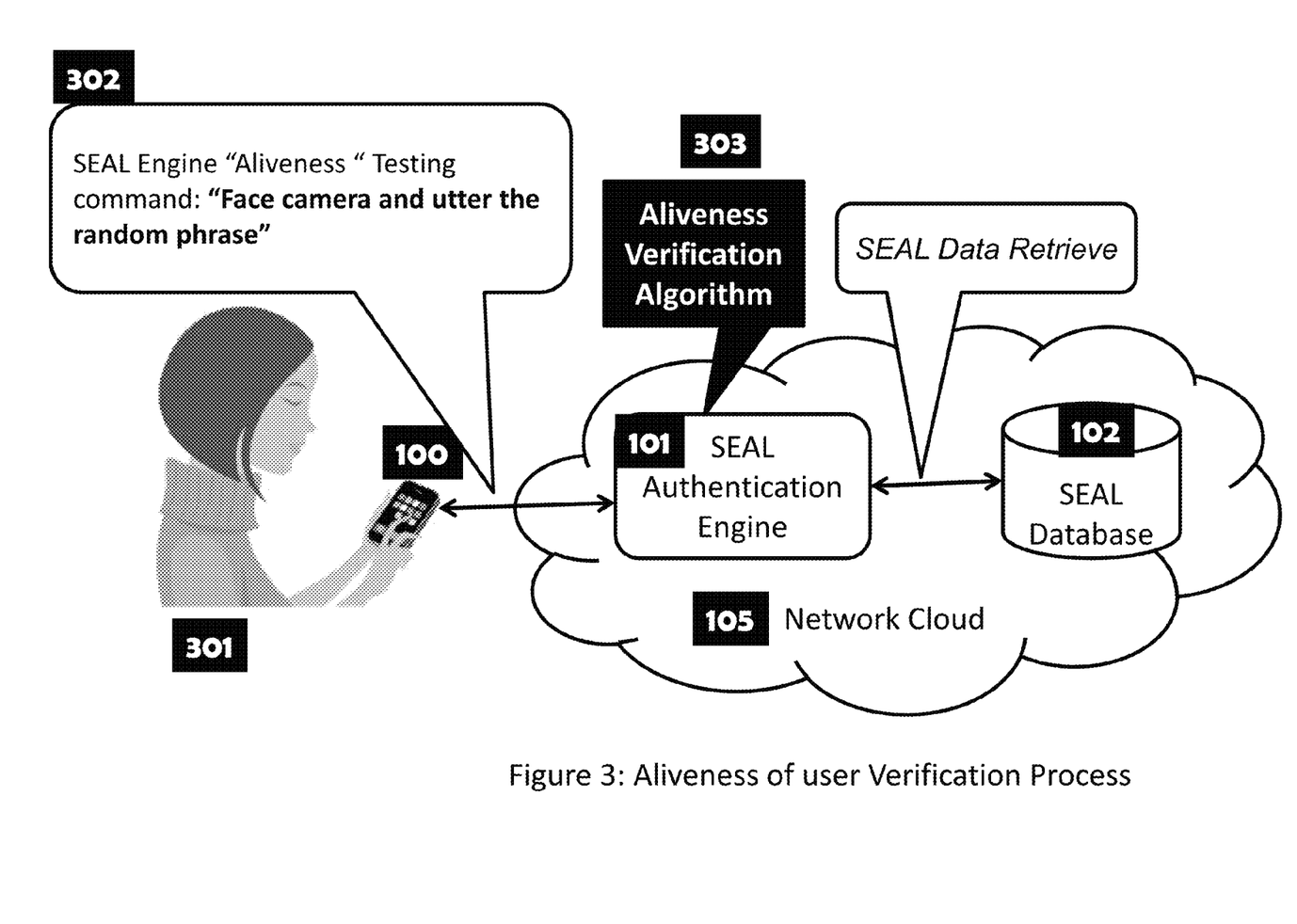
FIG. 3: Aliveness of user online Verification Process

FIG. 3 is a drawing showing the method used in this invention to ensure that the on-line user 301 is a "living breathing" person. The methodology requires the online user 301 to face the camera on the pervasive device 100 and be prompted to verbally utter concurrently a combination of randomly selected alphanumeric characters while facing a live video camera in the Pervasive Mobile Device 100, allowing the capture of the user's lip and eye movements. This "live" data is processed by the authentication engine 101 aliveness test algorithm 303 to determine whether the introduced biometric sample is coming from a "live source or person" and not a pervasive mobile device 100 generated (fake) biometric sample such as a still picture or a fake video facial image. The captured live video frame sequence is instantaneously submitted to the authentication engine 101 for "aliveness" determinations whereby the head, lip and eye movements are algorithmically analyzed to establish probabilistically that the user is without any doubt a living person. This makes the method virtually tamper-proof even by sophisticated and financially-motivated hackers.

In addition, the user is requested to furnish personal information, such as, mother's first name and maiden name, among other personal data that only the user would be privy to. Then the authentication engine correlates the user-provided biographical data against the biographical data 204 collected from CRA 103 as well as the biographical data 203 provided by the Service Provider 104 to generate a part of the Secure Authentication Identity Label, (SEAL).

Figure 4:
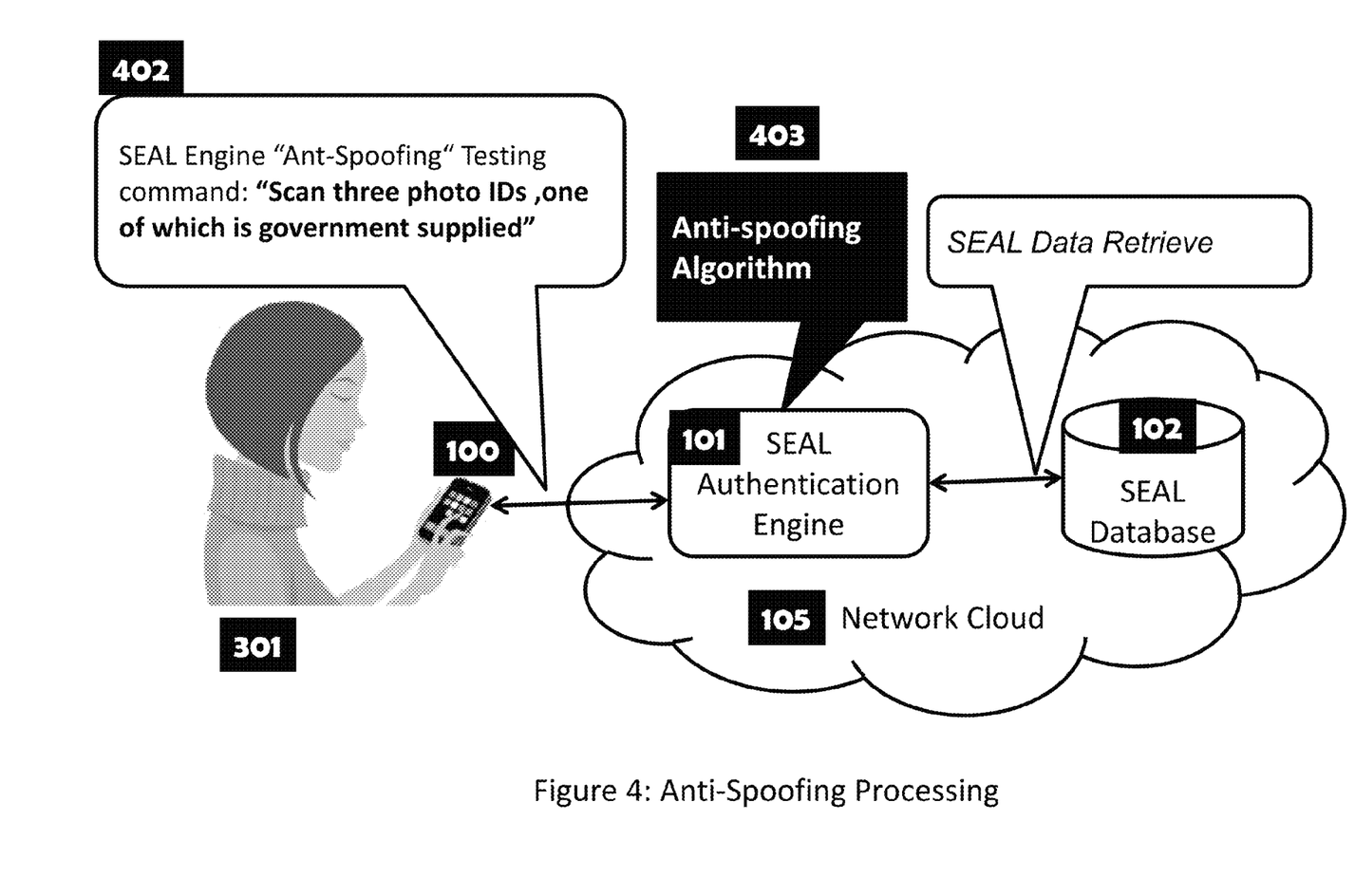
FIG. 4: Anti-Spoofing Process

In another embodiment of this invention, a method for vetting the credentials of an on line user 301 who is applying for enrollment to establish the true identity of the applicant before the application is processed. This identity counter-spoofing scheme prevents a user who has stolen someone else's identity document, eg. (a son who has stolen his father's identity document from his wallet), from successfully enrolling and subsequently be granted access to his father's online resources or services. This Identity Counter-Spoofing method in this invention requires an online applicant to scan three photo IDs one of which must be a government issued photo ID 402. These documents are scanned or photographed using a pervasive computing device 100 and submitted to the Anti-Spoofing algorithm 403 for further verification. The biographical information printed on the ID surface (front and back) and the user's ID photograph is then electronically compared with the equivalent biographical and biometric data captured during the actual live online enrollment process. If the online identity vetting and validation process is successful, normal online enrollment process is allowed to proceed. If, however, any identity discrepancies are detected or identified during the vetting and validation process, the enrollment is immediately halted which means the applying user is not granted an online identity. Furthermore, the applicant may be required or advised to escalate the matter to an exception handling and processing officer where the application will be subjected to further investigation and scrutiny.

Figure 5:
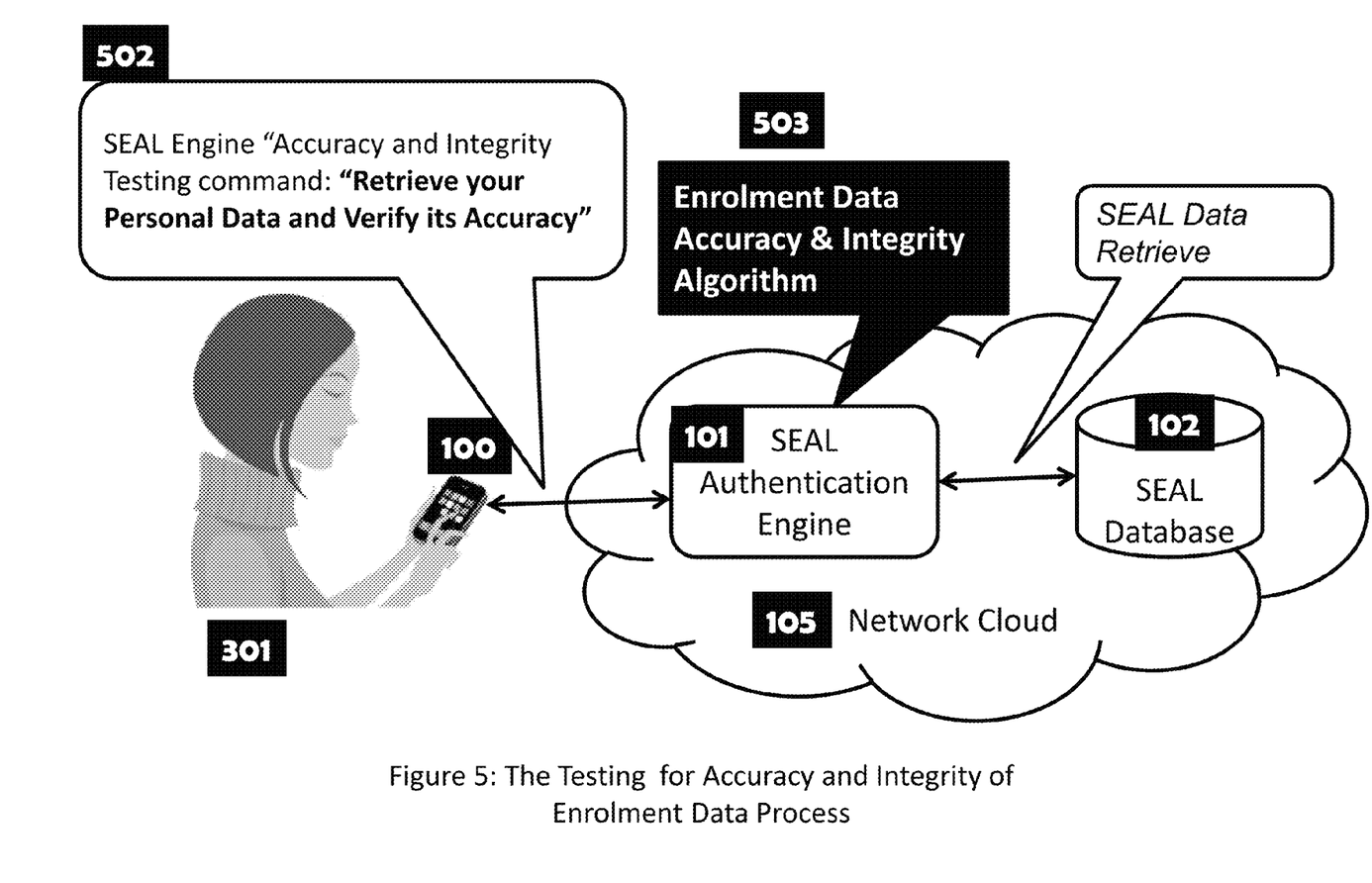
FIG. 5: The Testing for Accuracy and Integrity of Enrolment Data Process

FIG. 5 is diagram showing another embodiment of this invention showing, the method for verifying the accuracy and integrity of the enrolment data. In this invention a method to dynamically update the SEAL label in real time is presented here. As a living and dynamic authentication the SEAL label differs from prior art methods in which authentication is generally static which often makes the enrolment data information used for authentications out of date. This is a source of numerous and repeated complaints from users. It is a known fact that individuals will, overtime, move, age, get married, get a facelift, grow a beard, grow wrinkles, etc. These inevitable changes necessitate that the Enrolment Data stored in the Seal Data Base 102 be updated regularly. The SEAL includes a built-in feature that updates the SEAL Database using the latest information from CRA database 204, the latest Service Provider database 203 and the latest user data obtained during the previous service request. This method ensures that the user's enrolment credentials, (both the Biographical and Biometric data), on file are kept up to date, (i.e. ensuring "integrity and accuracy" of the users credentials on file), in line with the "Fourth Data Protection Principles". The Authentication Engine 101 Accuracy and Integrity Algorithm 503 routinely checks the enrolment database 102 against current service request data. In the event that "significant" differences, (eg address changes, location changes, passport number changes, etc), are detected between Enrolment Data 102 and the Service Request Data, the user is prompted to retrieve his/her biographical personal data and verify its accuracy 502 and to request changes. The Authentication Engine data Accuracy and Integrity Algorithm 503 utilizing current CRA's Data 204 and Service Provider's current data 205 has the ability to determine whether or not to implement the requested Enrolment Data updates through a process known as Reverse Identity Transfer Exchange (RITE).

Yet, another embodiment of the present invention involves the capturing of the Internet Protocol (IP) address and the GPS location co-ordinates of the pervasive mobile device 100 that is conducting an online user enrolment or service access transaction through the SEAL. The information is recorded and analyzed by the hacking-forensics investigation application, supported by the web enrollment and authentication portal. The IP address is used to determine the approximate geographical location of the visitor to the enrolment or authentication site including the country, nearby city and/or service provider. The GPS co-ordinates can also be used to determine the approximate location of the mobile device used during enrollment. The portal-based SEAL enrollment and service access application combines and analyzes the location forensics derived from the two independent but complementing sources to establish if the request is a genuine one from a known and expected geographic location as opposed to a domestic hacker or a hacker originating from a foreign country attempting to impersonate a legitimate user to gain unauthorized access to the services supported through the SEAL service portal. Hacking is confirmed by checking the user biographical and location information captured against the standard user profiles stored in the cloud. The user profiles can be manually specified by a system administrator or automatically learned by the cloud-based learning database. In user profile learning, the IP address and GPS co-ordinates of either a new applicant or an already registered user are captured and stored in the database for historical reference and future audit tracking. Future service access transactions can be correlated with existing profiles to establish normal or abnormal behavior with the objective of detecting a potential malicious hacker. This device data along with that created above (eg CRA data, Service Provide data 204, user's Enrolment Data 102) is used to generate a personal identity label called the SEAL label.

Figure 6:
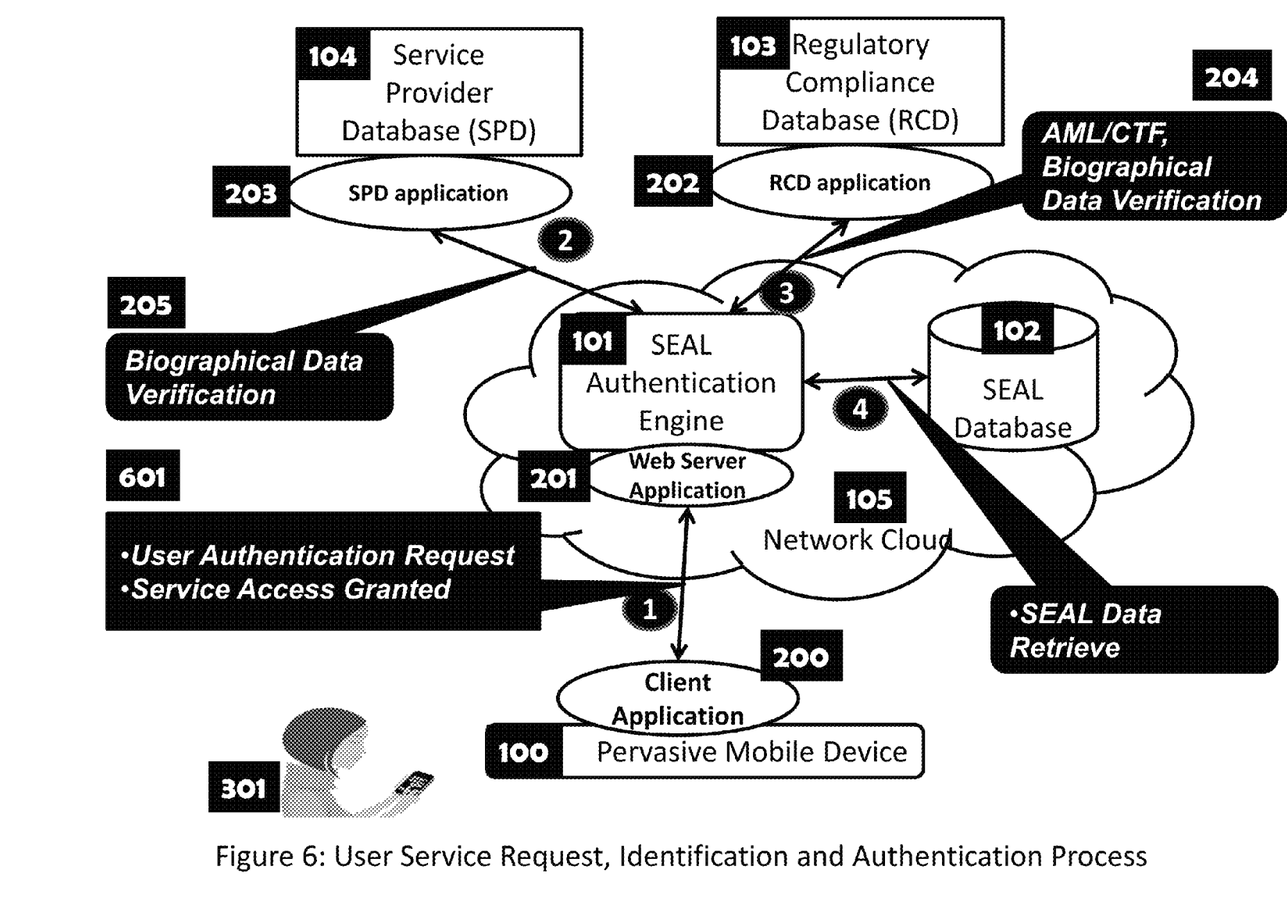
FIG. 6: User Service Request, Identification and Authentication Process

FIG. 6 is a diagram showing the embodiment of a complete process for an online user 301 request for service. In this invention the system and method that allows the registered users to request service is described. Upon a service request from a mobile user device 100, the following steps are performed:

a) Capturing by the Pervasive mobile Device 100 the voice print of the user when presented with a set of a random alphanumeric sequence while facing the camera of a pervasive device.

b) Capturing by the Pervasive mobile Device 100 biometric data, (eg facial print, iris scan, retina scan and or future DNA)

c) Capturing the GPS Location and MAC address of the user's Pervasive mobile Device 100 d) Optionally capturing personal data, such as Mother's Maiden Name, favorite pet, etc.

e) Packetizing biometric, biographical and other verification data;

f) Encrypting and transmitting the packetized data to the network cloud-based authentication engine.

p) Retrieving biographical data from Credit Reference Agencies (CRAs) 204;

q) Retrieving compliance data from Credit Reference Agencies (CRAs) 204 r) Retrieving biographical data from the Service Provider 205 s) Comparing the current GPS location against the enrolment GPS location and determining if the user location is out of the enrollment state or country t) Performing an "aliveness" test 303 as in FIG. 3 and generating a score u) Performing "anti-spoofing" test as in FIG. 4 and generating a score
v) Checking for "Accuracy and Integrity" of the enrolment data as in FIG. 5
w) Comparing the above data {ie steps: a), b), c), p),q), r), s), t), u)} against the enrolment data stored in the SEAL Database.
x) Finally generating a score based on step w) above.
y) Associating the voice print model and the personal label with the enrolment identifier assigned to the user to facilitate retrieval thereof during voice authentication of the user;
z) Dependent on the score in step x) the user is granted or denied access to the requested service Yet another claim of this patent application is the use of a live facial video frame sequence (LFVFS). Users are required to face the camera directly when uttering the randomly generated Alphanumeric Character Sequence, (ACS), which is recorded and captured by the user's pervasive mobile device camera 100 and submitted to the SEAL Authentication Engine (SAE) for storage in the SEAL Data Base 102. The SAE correlates the movement of the head, lips and eyes of the recorded facial video frame sequence with the randomly generated and dynamically changing ACS that is read by the user to detect and establish "aliveness". A minimum of 95% of "aliveness" correlation matching score must be algorithmically established to confirm that the user is actually present. The "aliveness" correlation eliminates the possibility of fraudulent use of a pre-recorded facial video frame sequence by a sophisticated mobile phone hacker.

One embodiment of the invention is a plurality of intelligent user devices and terminals such as mobile phones, phablets, tablet-PCs, Programmable Digital Assistant (PDAs), laptop computers, notebook computers, desktop computers, etc., all of which are equipped with a client application 200 whose function is to capture the required user biographical and biometric credentials and transmit to the network cloud servers and databases where the data is securely stored. During enrollment, the biometric and biographical credentials captured are used by the SAE to create a living SEAL label that is unique to the enrolled user. During service operation, the captured credentials are compared with the associated SEAL in the central database 102 or repository as part of the user authentication and authorization process.

One other embodiment of the present invention involves the control, management and maintenance of the biographical and biometric data of an enrolled user that is contained in the SEAL Database 102. In FIG. 1 this is referred to as the Service Management System 106 (SMS). SEAL Database 102 is continuously and dynamically updated in real time by the SMS to ensure that the authentication engine always points to and has access to the latest and most up-to-date biographical and biometric credentials associated with the user, in spite of any attempts or efforts on the part of the user to try to hide or suppress any negative or otherwise adverse personal information. For example, if an individual has his or her name added to the NO FLY list, this information will automatically be updated and reflected in the SEAL Database 102. Also, if the person is a politically exposed person (PEP) that information will automatically be added to the SEAL Database 102. Also, in many countries around the world, people seem to share names, which makes identification by name alone virtually impossible. Regardless of similarities of names, the variation in the spelling and difficulty in pronouncing these names, the SEAL authentication engine 101 is capable of addressing these issues using the unique biometric credentials captured and stored for each user during enrollment.

Figure 7:
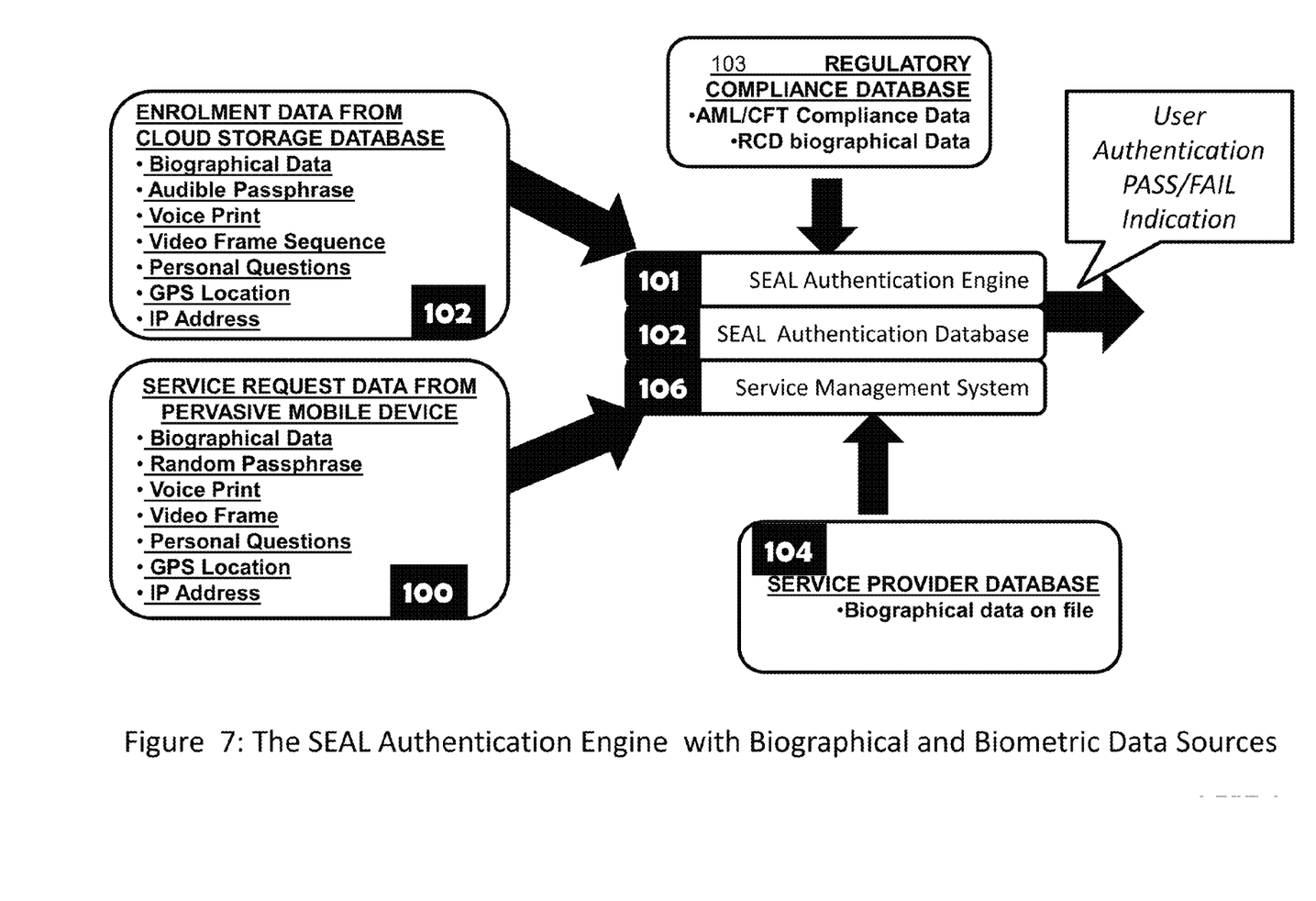
FIG. 7: The SEAL Authentication Engine with Biographical and Biometric Data Sources

A further embodiment of the present invention includes a cloud network-based Authentication Engine 101 as shown in FIG. 7. The key data groups that the Authentication Engine uses during authentication process are:
a) Enrolment database 102
b) Service Request Database from the Pervasive Mobile Device 100
c) Service Provider Database 104
d) Credit Reference Agency Database 103

The Authentication Engine is responsible for receiving the credentials captured by the client application 200 running on the user's pervasive mobile device 101, decrypting the information to its native form for processing, and authenticate the recovered information by comparing it with the associated data stored in the SEAL database 102 and other authoritative network cloud-based databases. In essence the physical user becomes the security token used for authentication.

Another embodiment of this invention is a network cloud-based cloud server application, (CSA), which is software that runs on the cloud based SEAL Authentication Engine (SAE) 101. The SEAL Authentication engine is responsible for the secure storage of the SEAL data in the cloud-based databases; comparing existing SEAL data with the captured credentials received from the user's pervasive mobile device; continually updating the SEAL data information and comparing it with the latest data in the Credit Reference Agencies 204 and securely communicating the SEAL data to the service providers for further processing.

One other embodiment of the present invention includes the authentication of individuals who sign on to social network sites, gaming casinos or try to lure minors by using fictitious identities. Individuals employing the SEAL-secured entity authentication label will be capable of finding the true identity and age of the individual via the authentication and verification process outlined above.

While certain examples of possible embodiments have been described others will be readily apparent to one skilled in the art. Accordingly the invention is not limited to the described embodiments but covers those that become evident from the claims.

ACRONYMS

SEAL—Secured Entity Authentication Label.
RITE—Reverse Identity Transfer Exchange.
SAAS—SEAL Alphanumeric Authentication Set.
SAE—SEAL Authentication Engine.
CSA—Cloud Server Application.
ESI—Encrypted Session Identifier.
LFVFS—Live Facial Video Frame Sequence.
ACS—Alphanumeric Character Sequence.
CRA—Credit Reference Agency.
AML—Anti Money Laundering.
EFTPOS—Electronic Funds Transfer at Point of Sale.
GPS—Global Positioning System.
MAC—Media Access Control Address.
PEP—Politically Exposed Person.
CFT—Counter Terrorism Funding.
CFPB—Consumer Financial Protection Bureau.
IPP—Internet Protocol.
NFC—Near Field Communication.
PIN—Personal Identification Number.
PDA—Programmable Digital Assistant.

We claim:

1. A dynamic method for identifying, and authenticating a user of a computing device based on user credentials, the method comprising:
   a. requesting the user to enrol by downloading an application and signing a personal consent release document presented to user by the computing device;
   b. capturing, by the computing device having a downloaded application, one or more biometric data of the user;
   c. obtaining, by the computing device, one or more of the user's biographical information from the user;
   d. capturing, by a camera of the computing device, one or more aliveness data by recording a live video sequences of the user;
   e. requesting, by the computing device, one or more of the user's current biographical data from authoritative government, commercial and private databases;
   f. determining, by the computing device, geographical location and identifier of the computing device;
   g. establishing, by the computing device, aliveness data of the user by analyzing movements of the captured live video sequences of the user;
   h. verifying, by the computing device, differences of the biographical information with the biographical data;
   i. prompting, by the computing device, to seek correction of the biographical information from the user for the verified differences;
   j. generating and storing, by the computing device, a secure entity authentication label (SEAL) by combining the biographical information, biometric data and the aliveness data;
   k. requesting, by the computing device, a subset of randomly selected biographical information, biometric data and aliveness data from the user upon a user's request for a service;
   l. generating, by the computing device, a new SEAL using the subset of randomly selected biographical information, biometric data and aliveness data from the user;
   m. comparing, by the computing device, the new SEAL with the stored SEAL;
   n. authenticating, by the computing device, service access to the requested service based on the compared result;
   o. updating, by the computing device, the stored SEAL by using the new SEAL.

2. The method of claim 1, wherein the biographical information comprising at least one of: birth date, birth certificate number, residential information, personal names, names of next of kin, email address, social media addresses, phone numbers, fax, social security number, passport number, driver's license number, student ID, Medicaid number, landed immigration number, major credit card numbers, bank account numbers, personal signature, and security questions to which only the user knows the answers.

3. The method of claim 1, wherein the biometric data comprising at least one of: digitized pictures of direct face and side views of the user, digitized complete set of fingerprints, digitized the voice prints of the user uttering set of alphanumeric characters, scan into the computing device a copy of any government supplied identity cards having photograph and signature of the user, iris scan data and retina analysis data, vein analysis data, and DNA data.

4. The method of claim 1, wherein the live video sequences is the user uttering a set of alphanumeric characters presented to the user.

5. The method of claim 3, wherein the biometric data is used to calculate an enrollment aliveness score by computing and storing:
   a. shape of the mouth each time the user utters the set of alphanumeric characters;
   b. pupil and eyelids movement each time the user utters the set of alphanumeric characters;
   c. number of head and eyebrow movements each time the user utters the set of alphanumeric characters;
   d. length of time the user takes to utter each alphanumeric character.

6. The method of claim 1, wherein the identifier of the computing device comprises at least one of Internet Protocol (IP) address and Media Access Control (MAC) address; and the geographical location as given by the Global Positioning System (GPS) coordinates.

7. The method of claim 1, further comprising:
   a. Scoring and ranking each of the one or more biographical information, each of the one or more biometric data, and each of the one or more aliveness data in the SEAL based on importance;
   b. Scoring and ranking each biographic information, biometric data and aliveness data in the new SEAL based on importance;
   c. Calculating an authentication label score using at least a combination of at least partial of the scores of the SEAL and at least partial of the scores of the new SEAL;
   d. Granting the user access to the requested service when the authentication label score exceeds a predetermined threshold value.

8. An apparatus for identifying, and authenticating a user based on user credentials, the apparatus comprising:
   A processor;
   A memory;
   A camera;
   A downloaded application, comprising computer program, wherein when processed by the processor, carries out the steps of:
   a. requesting the user to enrol by first signing a personal consent release document;
   b. capturing one or more biometric data of the user;
   c. obtaining one or more of the user's biographical information from the user;
   d. capturing, by the camera, one or more aliveness data by recording a live video sequences of the user;
   e. requesting one or more of the user's current biographical data from authoritative government, commercial and private databases;
   f. determining geographical location and identifier of the computing device;
   g. establishing aliveness data of the user by analyzing movements of the captured live video sequences of the user;
   h. verifying differences of the biographical information with the biographical data;
   i. prompting to seek correction of the biographical information from the user for the verified differences;
   j. generating and storing a secure entity authentication label (SEAL) by combining the biographical information, biometric data and the aliveness data;
   k. requesting a subset of randomly selected biographical information, biometric data and aliveness data from the user upon a user's request for a service;

l. generating a new SEAL using the subset of randomly selected biographical information, biometric data and aliveness data from the user;

m. comparing the new SEAL with the stored SEAL;

n. authenticating service access to the requested service based on the compared result;

o. updating the stored SEAL by using the new SEAL.

9. The apparatus of claim 8, wherein the biographical information comprising at least one of: birth date, birth certificate number, residential information, personal names, names of next of kin, email address, social media addresses, phone numbers, fax, social security number, passport number, driver's license number, student ID, Medicaid number, landed immigration number, major credit card numbers, bank account numbers, personal signature, and security questions to which only the user knows the answers.

10. The apparatus of claim 8, wherein the biometric data comprising at least one of: digitized pictures of direct face and side views of the user, digitized complete set of fingerprints, digitized the voice prints of the user uttering set of alphanumeric characters, scan into the computing device a copy of any government supplied identity cards having photograph and signature of the user, iris scan data and retina analysis data, vein analysis data, and DNA data.

11. The apparatus of claim 8, wherein the live video sequences is the user uttering a set of alphanumeric characters presented to the user.

12. The apparatus of claim 10, wherein the biometric data is used to calculate an enrollment aliveness score by computing and storing:

a. shape of the mouth each time the user utters the set of alphanumeric characters;

b. pupil and eyelids movement each time the user utters the set of alphanumeric characters;

c. number of head and eyebrow movements each time the user utters the set of alphanumeric characters;

d. length of time the user takes to utter each alphanumeric character.

13. The apparatus of claim 8, wherein the identifier of the computing device comprises at least one of Internet Protocol (IP) address and Media Access Control (MAC) address; and the geographical location as given by the Global Positioning System (GPS) coordinates.

14. The apparatus of claim 8, wherein the downloaded application, when processed by the processor, further carries out the steps of:

a. Scoring and ranking each of the one or more biographical information, each of the one or more biometric data, and each of the one or more aliveness data in the SEAL based on importance;

b. Scoring and ranking each biographic information, biometric data and aliveness data in the new SEAL based on importance;

c. Calculating an authentication label score using at least a combination of at least partial of the scores of the SEAL and at least partial of the scores of the new SEAL;

d. Granting the user access to the requested service when the authentication label score exceeds a predetermined threshold value.

* * * * *